(12) United States Patent
Antonelli et al.

(10) Patent No.: US 7,207,725 B1
(45) Date of Patent: *Apr. 24, 2007

(54) OPTICAL FIBER COUPLER

(75) Inventors: Lynn T. Antonelli, Cranston, RI (US); Patrick J. Monahan, Gales Ferry, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 216 days.

This patent is subject to a terminal disclaimer.

(21) Appl. No.: 10/644,549

(22) Filed: Aug. 19, 2003

Related U.S. Application Data

(63) Continuation-in-part of application No. 10/251,693, filed on Sep. 17, 2002, now Pat. No. 6,609,836.

(51) Int. Cl.
*G02B 6/38* (2006.01)

(52) U.S. Cl. .............................. 385/70; 385/53; 385/55

(58) Field of Classification Search .................. 385/53, 385/55, 59, 70, 71, 80, 81, 9
See application file for complete search history.

(56) References Cited

U.S. PATENT DOCUMENTS

| | | | | |
|---|---|---|---|---|
| 4,191,446 A | * | 3/1980 | Arditty et al. ................. 385/42 |
| 4,195,045 A | * | 3/1980 | Mead ......................... 264/1.25 |
| 4,913,508 A | * | 4/1990 | Blyler, Jr. et al. ............. 385/50 |
| 5,030,321 A | * | 7/1991 | Coutandin et al. ............. 216/24 |
| 5,166,993 A | * | 11/1992 | Blyler, Jr. et al. ............. 385/31 |
| 5,224,189 A | * | 6/1993 | Maas et al. .................... 385/98 |
| 6,609,836 B1 | * | 8/2003 | Antonelli et al. ............. 385/70 |

* cited by examiner

*Primary Examiner*—Jennifer Doan
(74) *Attorney, Agent, or Firm*—James M. Kasischke; Jean-Paul A. Nasser; Michael P. Stanley

(57) ABSTRACT

Optical fiber coupler for coupling fiber optic elements includes a first fiber optic element extending in a first direction to position a free end thereof in a selected zone, and a second fiber optic element extending into the selected zone from an opposite direction to position a free end of the second fiber optic element in the zone confronting the first fiber optic element free end. A cured optical grade epoxy resin body defines the zone and envelopes the free ends of the fiber optic elements, to effect physical and optical connection between the first and second fiber optic elements. Once cured, the housing material is removed leaving the completed coupler device. The free ends of the fiber optic elements are in close proximity, or in the case of coupling from one strand to a plurality of strands, in enough of a spaced relation, to permit required light diffusion.

1 Claim, 3 Drawing Sheets

OPTICAL FIBER COUPLER

The present invention is a continuation-in-part of U.S. application Ser. No. 10/251,693, filed 17 Sep. 2002, now U.S. Pat. No. 6,609,836, in the names of Lynn T. Antonelli and Patrick J. Monahan.

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The invention relates to fiber optic elements and is directed more particularly to an optical fiber coupler wherein fiber optic elements are coupled so as to provide a physical and optical connection therebetween.

(2) Description of the Prior Art

Fiber optic strands typically include a central region in which light propagates, a cladding region to contain the light within the central region, and customarily a protective jacket. It is generally known to consolidate light carried in a group of fiber optic strands into a single strand, and, conversely, to channel light broadcast through a single strand into a plurality of strands in a bundled fiber optic element. Either way, it is necessary that light be released from one or more fiber optic strands and captured by another one or more fiber optic strands.

To couple fiber optic strands such that light is transferred from one to the other, it is common to remove protective jackets and cladding from the strands, fuse the strands together, and then re-jacket the coupled strands for structural integrity. Alternatively, welding together of the fiber optic strands has been utilized, which affects the cladding only at the welding site. In other instances, the fiber optic strands have simply been terminated and lenses are used to feed the light into the receiving strand or strands. In still other instances, glass-based waveguides have been attached to optical fibers for transmitting light therebetween.

There is a need for a coupler for interconnecting fiber optic strands wherein the strands are connected both optically and physically without the need for lenses, waveguides, and the like.

SUMMARY OF THE INVENTION

An object of the invention is, therefore, to provide an optical fiber coupler wherein first and second fiber optic elements are connecting together optically and physically, such that the elements need not be altered prior to being connected, do not require any intermediary lenses, or the like, and such that the connection, once effected, serves to provide structural integrity.

With the above and other objects in view, a feature of the present invention is the provision of an optical fiber coupler for connecting a first fiber optic element to a second fiber optic element. The coupler comprises a first fiber optic element extending in a first direction whereby to position a free end of the first fiber element in a selected zone, and a second fiber optic element extending into the selected zone from a direction generally opposite to the first direction, such that a free end of the second fiber optic element is disposed in the selected zone in confronting relationship with the first fiber optic element free end. A cured optical grade epoxy resin body defines the selected zone and envelopes the free ends of the elements to provide physical and optical connection between the first and second fiber optic elements. Once, cured, the housing material is removed, leaving the completed coupler device. The free ends of the fiber optic elements are in close proximity to one another, or in the case of coupling from one strand to a plurality of strands, in enough of a spaced relationship to cause needed light diffusion in the resin medium.

The above and other features of the invention, including various novel details of construction and combinations of elements, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the several views of the drawings and wherein.

DESCRIPTION OF THE PREFERRED EMBODIMENTS

Figure 2:
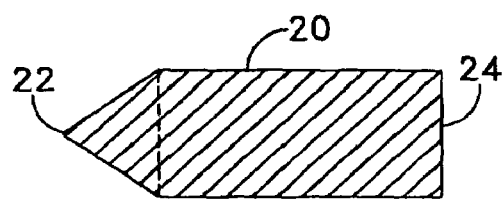
FIG. 2 is a sectional view taken along line II—II of FIG. 1.
Figure 1:
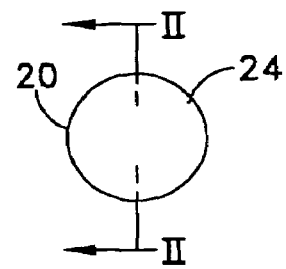
FIG. 1 is an end elevational view of one form of a rigid body member for forming an embodiment of the invention.

Referring to FIGS. 1 and 2, it will be seen that in manufacture of the optical fiber coupler there is firstly provided a rigid body 20 of a selected configuration, such as conical. The body 20 forms a mold core and preferably is of a metal, such as brass or aluminum. In a conical configuration the body 20 is provided with a pointed end 22 and a circular base end 24. The body 20, in one embodiment, is about one inch long with a diameter of about 0.375 in. and a pointed end taper of about 30° from the internal central axis of the body.

Figure 4:
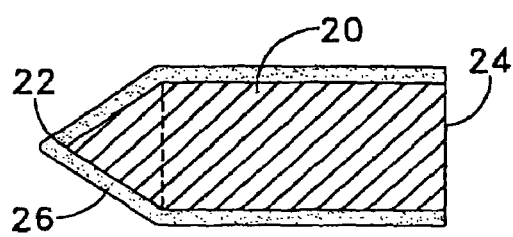
FIG. 4 is a sectional view taken along line IV—IV of FIG. 3.
Figure 3:
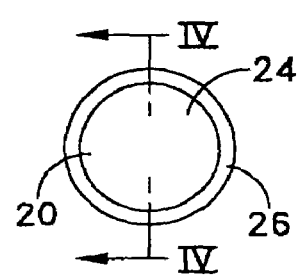
FIG. 3 is an end elevational view of the rigid body member of FIG. 1 with a wax coating thereon.
Figure 6:
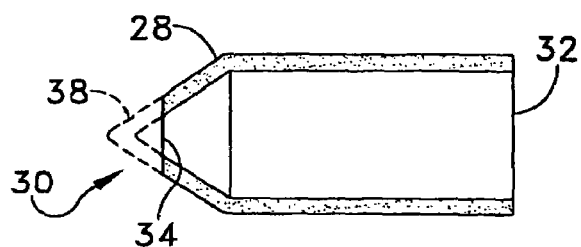
FIG. 6 is a sectional view taken along line VI—VI of FIG. 5.
Figure 5:
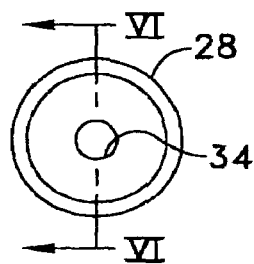
FIG. 5 is an end elevational view similar to FIG. 3, but with the rigid body member removed from the wax to provide a hollow wax housing.

As shown in FIGS. 3 and 4, the body 20 is coated with a layer of mold making wax 26 extending over all outer surfaces of the body 20 except the base end 24, as by building up the layer through repeated dipping of the body into molten wax. The wax 26 is hardened, as by freezing or curing. Upon removal of the body 20 from the wax 26, there is provided a hollow wax housing 28 (FIGS. 5 and 6) having a pointed end 30 and an open-base end 32. A portion 38 of the housing 28, shown in phantom in FIG. 6, is removed to provide a hole 34 in the pointed end 30.

Figure 8:
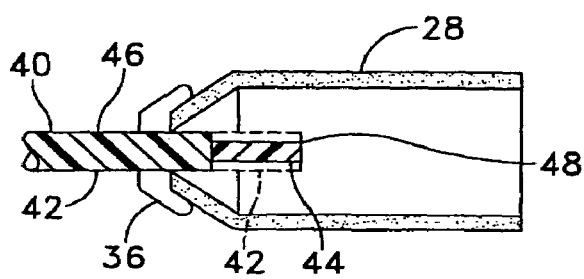
FIG. 8 is a sectional view taken along line VIII—VIII of FIG. 7.
Figure 7:
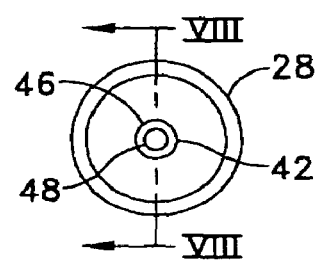
FIG. 7 is an end elevational view similar to FIG. 5, but showing a first fiber optic element disposed in the wax housing.

A first fiber optic element 40, which may comprise a single fiber optic strand 42, is inserted into the housing 28 through the hole 34 made in the housing pointed end 30, to position a free end 44 of the first fiber optic element 40 in the housing 28. The form which free end 44 takes is a butt-ended termination of strand 42. A sealant 36 is used to seal the hole 34 around the strand 42, as shown in FIG. 8. The diameter of the hole 34 is complementary to the diameter of the strand 42.

Prior to insertion of the first element strand 42, about ¼ inch of a jacket 46 covering a central region 48 of the strand 42 may be removed to expose ¼ inch, or so, of the central region 48, as shown in FIG. 8. However, removal of the jacket end is not necessary for the function of the connection, but may improve entrapment within resin 60 in the housing 28, described further hereinbelow.

Figure 9:
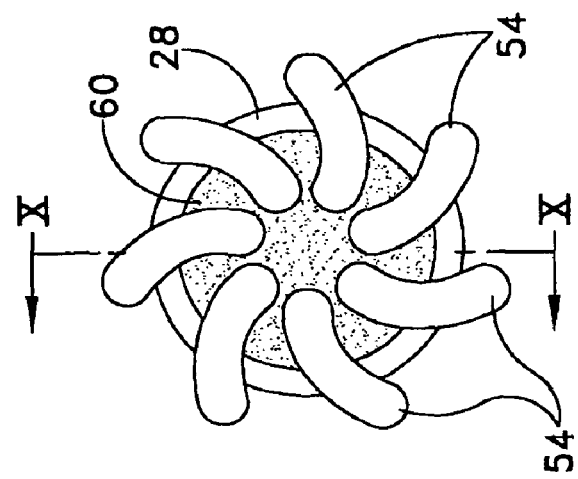
FIG. 9 is an end elevational view of the wax housing of FIGS. 7 and 8, and showing a second fiber optic element including a plurality of strands disposed in the wax housing and potted in an epoxy resin.
Figure 10:
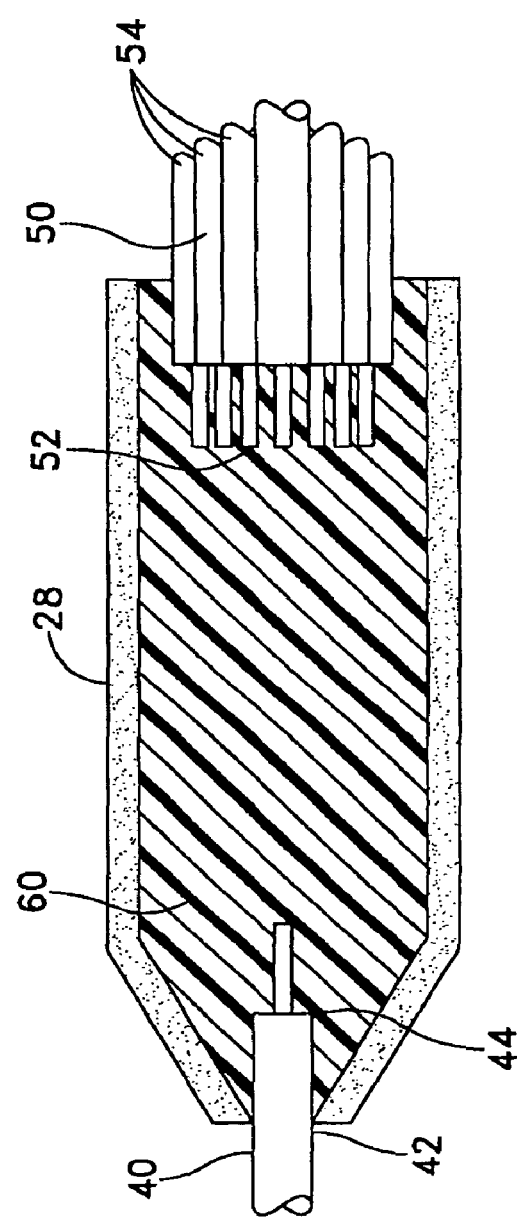
FIG. 10 is a sectional view taken along line X—X of FIG. 9, simplified and with certain components in side elevation for clarity.

After the first fiber optic element 40 is in place, a second fiber optic element 50 is inserted into the open-base end 32 of housing 28 to position a free end 52 of the second fiber optic element 50 in the housing 28 and in confronting relation to the first fiber optic element free end 44, as shown in FIG. 10. The second fiber optic element 50 may comprise a plurality of second fiber optic strands 54. Again, the form which the free ends 52 of strands 54 take are butt-ended terminations of each strand, with a linear marginal edge portion of the jacket 46 of each strand 42, 54 optionally removed. In one embodiment, shown in FIG. 9, the plurality of strands 54 is inserted into the open-base end 32 of wax housing 28 in a ring-like arrangement about the central axis of the housing.

Figure 11:
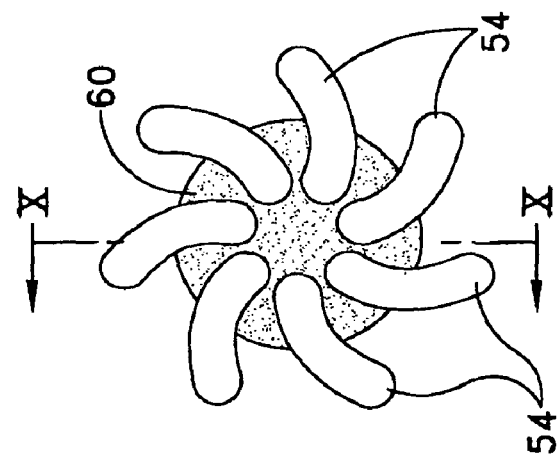
FIG. 11 is an end elevational view similar to FIG. 9, but showing the coupler with the wax housing removed.
Figure 12:
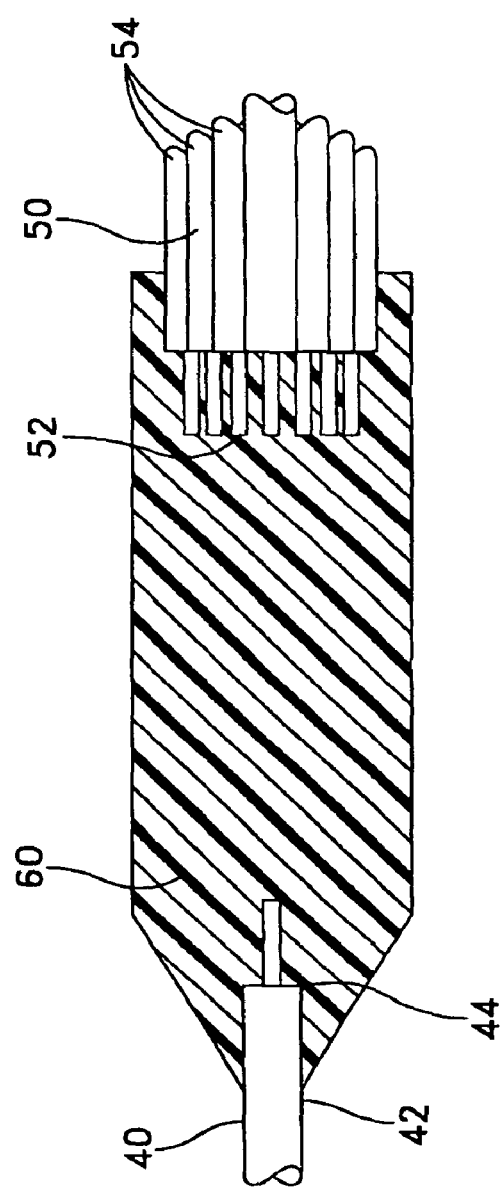
FIG. 12 is similar to FIG. 10, but with the wax housing removed.

The housing 28 is then filled with the optical grade epoxy resin 60, which is allowed to cure, thereby potting all the fiber optic strands 42, 54 in place in the housing 28. The wax housing 28 is then removed, completing formation of the optical fiber coupler, FIGS. 11 and 12.

In the cases of either or both of fiber optic elements 40 and 50 comprising a plurality of butt-end terminations of fiber optic strands, free ends 44 and 52 are spaced apart by a distance allowing a sufficient extent of spatial diffusion of light issuing from the butt-ended fibers and propagating in the optical grade epoxy resin therebetween to couple light between each strand of the first element with each strand of the second element. However, in the case of fiber optic elements 40 and 50 each consisting of a single fiber optic element, the free ends 44, 52 may be spaced as close as is practical.

Light exiting either the first or second fiber optic elements 40, 50 is propagated out of the appropriate strand end or ends 44, 52. Light exiting the selected element is transported through the cured optically transparent resin 60 towards the receiving fiber optic element.

The coupler described hereinabove provides a connection which allows light to be coupled from a group of optical fiber strands into a single strand or several other strands, or from a single strand into another single strand or into a plurality of strands. Further, it is to be understood that an n-by-n coupler may be provided. The first and second fiber optic elements 40 and 50 in an n-by-n coupler each comprise a plurality of strands. Such n-by-n couplers find utility in linear arrays of pulse responsive, 2-mode, in-line within a fiber, Fabry-Perot interference cavity sensors, which are disclosed in U.S. patent application Ser. No. 06/795,843, filed 4 Sep. 1985, now U.S. Pat. No. 6,515,939, by Eugene Green et al, entitled "Pulse Sample Optical Fiber Hydrophone Array". In the type of hydrophone array systems which employ pulse-responsive, 2-mode, interference cavity fiber sensors as their individual hydrophone elements, one of the strands of first fiber optic element 40 propagates pulses to a plurality of strings of fiber sensors connected to respective strands of the plurality of strands of the second fiber optic element 50. The distal positioning of individual sensors on a string, and an arrangement of different delay lengths of fibers at the front end of respective strings of sensors cause the reflected signals from the sensors to return to the respective strands of second fiber optic elements 50 in time division sampled relationship. These time division sampled signals propagate to a second strand of first fiber optic element 40 which couples them to a receiver processor.

In addition to serving as an optical connection between the first and second fiber optic elements 40, 50, the coupler simultaneously provides a physical connection of structural integrity. The resin 60 provides a protective shield for the fibers. Inasmuch as there is no need to remove whatever cladding and jacketing may be present on the fiber optic strands, such protective layers remain in the finished coupler, providing additional security. As noted above, a small end portion of the jacket 46 may be removed (FIG. 8) for improved bonding, depending on the material of the strand 42 and the epoxy resin used.

It will be apparent that the housing 28 may be of any selected configuration and while the illustrated cone shape is appropriate for a first fiber optic element including only one or a few strands and a second fiber optic element including a comparatively large number of strands, other housing shapes are suitable for other variations of elements. The respective elements preferably are insertable from generally opposite directions so that the free ends thereof are positioned opposite to each other and in close proximity to each other. Alternatively, if diffusion of light is necessary because one or both of the fiber optic elements comprises a plurality of strands, then sufficient space is provided therebetween to allow such diffusion.

There is thus provided a coupler for connecting together first and second fiber optic elements optically and physically, such that the coupler serves to transport light from one element to the other and serves further as supporting and protective structure.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A method for connecting a first fiber optic element to a second fiber optic element, the method comprising the steps of:

providing a rigid elongated body having a cone-shaped end and an opposite circular and planar base end;

coating outer surfaces of the body other than the base end with a layer of mold making wax;

separating the body from the wax to provide a hollow wax housing having a cone-shaped end and an open base end;

providing a hole in an apex of the housing cone-shaped end;

inserting a first fiber optic element comprising a single fiber optic strand through the hole in a first direction into the wax housing to position a free end of the single fiber optic strand in the housing;

applying a sealant to the single strand at the housing apex hole;

inserting the second fiber optic element comprising a plurality of fiber optic strands into the wax housing through the open-base end from a direction generally opposite to the first direction to position free ends of the plurality of fiber optic strands in the housing and proximate the single fiber optic strand free end, the positions to which the free ends of said first and second element strands are inserted being spaced apart by a distance to allow a sufficient extent of diffusion of light in the optical grade epoxy resin therebetween to couple light between the strand of the first fiber optic element and each strand of the second of the fiber optic elements;

filling the wax housing with optical grade epoxy resin and permitting the resin to cure;

whereby to effect physical and optical connection between the first and second fiber optic elements; and removing the wax housing from the resin.

* * * * *